(12) United States Patent
Kim et al.

(10) Patent No.: US 12,731,559 B2
(45) Date of Patent: Sep. 8, 2026

(54) METHOD, APPARATUS, AND SYSTEM FOR OBTAINING COMPENSATION BASIC DATA OF DISPLAY PANEL

(71) Applicants: Hefei Visionox Technology Co., Ltd., Hefei (CN); KunShan Go-Visionox Opto-Electronics Co., Ltd., Kunshan (CN)

(72) Inventors: Min-Cheol Kim, Kunshan (CN); Xiujian Zhu, Kunshan (CN)

(73) Assignees: Hefei Visionox Technology Co., Ltd., Hefei (CN); KunShan Go-Visionox Opto-Electronics Co., Ltd., Kunshan (CN)

( * ) Notice: Subject to any disclaimer, the term of this patent is extended or adjusted under 35 U.S.C. 154(b) by 0 days.

(21) Appl. No.: 19/205,982

(22) Filed: May 12, 2025

(65) Prior Publication Data

US 2025/0273183 A1 Aug. 28, 2025

Related U.S. Application Data

(63) Continuation of application No. PCT/CN2023/096738, filed on May 29, 2023.

(30) Foreign Application Priority Data

Nov. 30, 2022 (CN) ........................ 202211544119.6

(51) Int. Cl.
*G09G 5/10* (2006.01)
*G06T 5/80* (2024.01)
(Continued)

(52) U.S. Cl.
CPC ................ *G09G 5/10* (2013.01); *G06T 5/80* (2024.01); *G06T 7/64* (2017.01); *G06V 10/60* (2022.01);
(Continued)

(58) Field of Classification Search
CPC ... G09G 2300/0819; G09G 2300/0861; G09G 2310/0251; G09G 3/3233
See application file for complete search history.

(56) References Cited

U.S. PATENT DOCUMENTS

2004/0008172 A1* 1/2004 Nakamura .......... H04N 25/441 348/E3.018
2008/0008485 A1* 1/2008 Morikawa .......... G03G 15/5041 399/49
(Continued)

FOREIGN PATENT DOCUMENTS

CN 107464524 A 12/2017
CN 110992887 A 4/2020
(Continued)

OTHER PUBLICATIONS

International Search Report of Application No. PCT/CN2023/096738.
First Office Action of Application No. CN 202211544119.6.

*Primary Examiner* — Van N Chow
(74) *Attorney, Agent, or Firm* — Kilpatrick Townsend & Stockton LLP

(57) ABSTRACT

Embodiments of the present application disclose a method, an apparatus, and a system for obtaining compensation basic data of a display panel. Compensation basic data of different display panels is obtained simultaneously by using different obtaining regions of an image sensing board of a camera; and before the basic compensation data is obtained, uniformity compensation is performed on the image sensing board of the camera, and a difference in compensation basic data when the same display image is obtained by using a plurality of obtaining regions obtained by dividing the image sensing board is less than or equal to a set threshold. This reduces errors in the obtained compensation basic data due to poor uniformity of the plurality of obtaining regions of the image
(Continued)

sensing board of the camera, thereby ensuring the accuracy of compensation data determined based on the compensation basic data.

19 Claims, 9 Drawing Sheets

(51) Int. Cl.
*G06T 7/64* (2017.01)
*G06V 10/60* (2022.01)

(52) U.S. Cl.
CPC ............... *G09G 2320/0233* (2013.01); *G09G 2320/0626* (2013.01); *G09G 2360/147* (2013.01)

(56) References Cited

U.S. PATENT DOCUMENTS

| | | | | |
|---|---|---|---|---|
| 2017/0061902 | A1* | 3/2017 | Zhang | G09G 3/3426 |
| 2019/0373206 | A1 | 12/2019 | Kang et al. | |
| 2020/0005691 | A1 | 1/2020 | Yoo et al. | |

FOREIGN PATENT DOCUMENTS

| | | | |
|---|---|---|---|
| CN | 111735768 | A | 10/2020 |
| CN | 112825232 | A | 5/2021 |
| CN | 113380177 | A | 9/2021 |
| CN | 114495812 | A | 5/2022 |
| CN | 114898706 | A | 8/2022 |
| CN | 115942127 | A | 4/2023 |
| WO | 2017116134 | A1 | 7/2017 |
| WO | 2019214449 | A1 | 11/2019 |

* cited by examiner

METHOD, APPARATUS, AND SYSTEM FOR OBTAINING COMPENSATION BASIC DATA OF DISPLAY PANEL

The present application is a continuation of International Application No. PCT/CN2023/096738 filed on May 29, 2023, which claims priority to Chinese Patent Application No. 202211544119.6, filed with the China National Intellectual Property Administration on Nov. 30, 2022 and entitled "METHOD, APPARATUS, AND SYSTEM FOR OBTAINING COMPENSATION BASIC DATA OF DISPLAY PANEL, AND STORAGE MEDIUM", both of which are hereby incorporated by reference in their entireties.

FIELD

The present application relates to the field of display technologies, and in particular, to a method, an apparatus, and a system for obtaining compensation basic data of a display panel.

BACKGROUND

With the development of display technologies, users have increasingly high requirements for display quality. In order to improve the display quality, voltage drop compensation is widely applied to display panels.

In the related art, compensation basic data required for voltage drop compensation is usually obtained by capturing a display image of a display panel using a camera.

However, the obtaining of the compensation basic data is time-consuming and the costs of hardware devices for obtaining the compensation basic data are high in the related art.

SUMMARY

The present application provides a method, an apparatus, and a system for obtaining compensation basic data of a display panel, to improve the efficiency of obtaining the compensation basic data and lower the costs of hardware devices for obtaining the compensation basic data.

According to a first aspect, an embodiment of the present application provides a method for obtaining compensation basic data of a display panel. The method includes: performing uniformity compensation on an image sensing board of a camera, and a difference in compensation basic data when the same display image is obtained by using a plurality of obtaining regions obtained by dividing the image sensing board is less than or equal to a set threshold, where the image sensing board includes at least two obtaining regions; and simultaneously obtaining compensation basic data of different display panels by using different obtaining regions of the image sensing board, where the compensation basic data is used to determine compensation data used for luminance compensation of the display panel.

According to a second aspect, an embodiment of the present application provides an apparatus for obtaining compensation basic data of a display panel. The apparatus includes:

a compensation module configured to perform uniformity compensation on an image sensing board of a camera, and a difference in compensation basic data when the same display image is obtained by using obtaining regions obtained by dividing the image sensing board is less than or equal to a set threshold, where the image sensing board includes at least two obtaining regions; and an obtaining module configured to simultaneously obtain compensation basic data of different display panels by using different obtaining regions of the image sensing board, where the compensation basic data is used to determine compensation data used for luminance compensation of the display panel.

According to a third aspect, an embodiment of the present application provides a system for obtaining compensation basic data of a display panel. The obtaining system includes a camera and a plurality of display panels, where the camera is configured to obtain compensation basic data of the plurality of display panels by using the method for obtaining compensation basic data of a display panel according to the first aspect.

In the method for obtaining compensation basic data of a display panel according to the embodiments of the present application, compensation basic data of different display panels is obtained simultaneously by using different obtaining regions of the image sensing board of the camera, and simultaneous capturing of the display images of the plurality of display panels using one camera is implemented. In this way, the overall capturing efficiency is improved, and the production efficiency of the display panels is thus improved. In addition, the number of cameras used to obtain the compensation basic data during mass production of the display panels is reduced, and the costs of hardware devices are lowered. Before the compensation basic data is obtained, the uniformity compensation is performed on the image sensing board of the camera, and the difference in the compensation basic data when the same display image is obtained by using the obtaining regions obtained by dividing the image sensing board is less than or equal to the set threshold, which reduces the difference in the compensation basic data obtained by using the obtaining regions. Therefore, when the compensation basic data of the display images of the plurality of display panels is subsequently obtained by using different obtaining regions of the image sensing board, the difference in the compensation basic data when the same display image is obtained by using the obtaining regions is less than or equal to the set threshold, which reduces errors in the obtained compensation basic data due to poor uniformity of the obtaining regions of the image sensing board of the camera, thereby ensuring the accuracy of compensation data determined based on the compensation basic data.

DETAILED DESCRIPTION OF THE EMBODIMENTS

Figure 1:
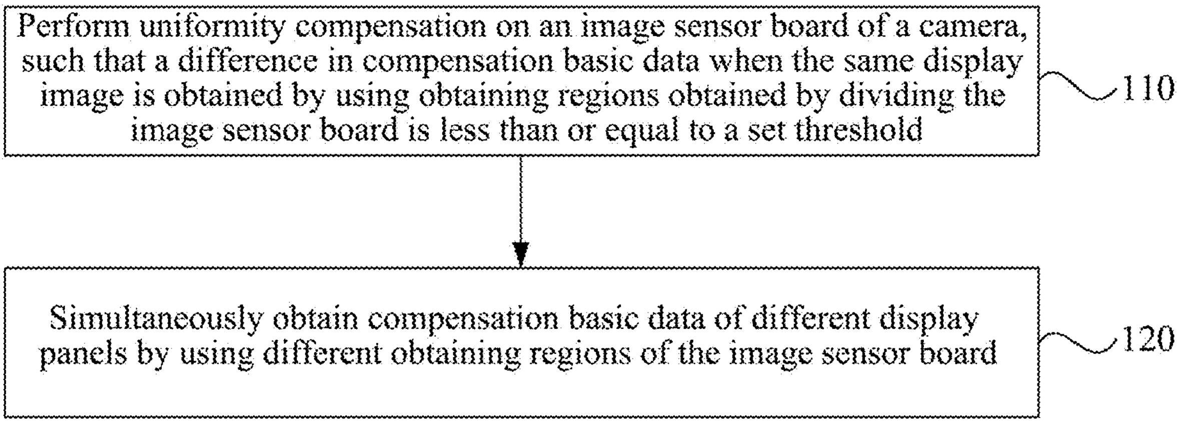
FIG. 1 is a flowchart of a method for obtaining compensation basic data of a display panel according to an embodiment of the present application.

The present application is further described in detail below with reference to the accompanying drawings and embodiments. It can be understood that specific embodiments described herein are used merely to explain the present application, rather than limit the present application. It should be additionally noted that, for ease of description, only a portion but not all structures related to the present application are shown in the drawings.

Just as described in the background, the obtaining of compensation basic data is time-consuming and the costs of devices for obtaining the compensation basic data are high in the related art. The inventors have found through research that the reason for the above problems is that in the related art, compensation basic data required for voltage drop compensation is usually obtained by capturing a display image of one display panel using one camera, which has low obtaining efficiency, and consumes much time to obtain the compensation basic data. In addition, the obtaining of the compensation basic data is performed in a production process, which results in a decrease in the production efficiency of display panels. Moreover, when compensation basic data of a plurality of display panels is simultaneously obtained, a plurality of cameras are required, with each camera photographing one display panel. As a result of a greater number of cameras used, high costs of hardware devices for obtaining the compensation basic data are incurred.

For the above reasons, an embodiment of the present application provides a method for obtaining compensation basic data of a display panel. FIG. 1 is a flowchart of a method for obtaining compensation basic data of a display panel according to the embodiment of the present application. Referring to FIG. 1, the method for obtaining compensation basic data of a display panel includes the following steps.

Step 110: Perform uniformity compensation on an image sensing board of a camera, and a difference in compensation basic data when the same display image is obtained by using obtaining regions obtained by dividing the image sensing board is less than or equal to a set threshold. The image sensing board includes at least two obtaining regions.

Figure 2:
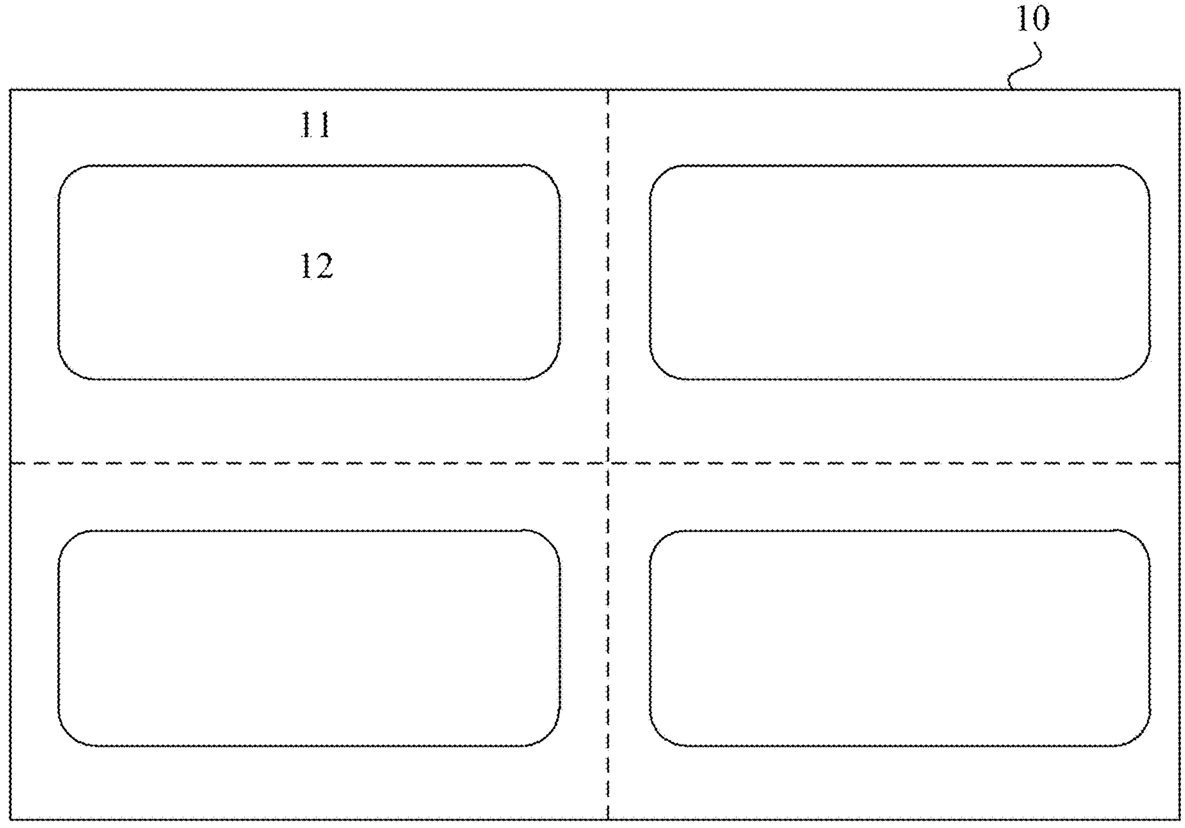
FIG. 2 is a schematic diagram of division of an image sensing board into obtaining regions according to an embodiment of the present application.

Specifically, the camera in this embodiment may be a Mono camera or a Color camera. The camera includes the image sensing board. When the camera performs photographing, the image sensing board is used to obtain the compensation basic data of the display image, where the compensation basic data is luminance data. The image sensing board 10 includes a plurality of sensor devices, which inevitably have parameter differences therebetween during production. In addition, with the use of the camera, the devices in the image sensing board 10 may be aging. All of the above can lead to poor uniformity of the image sensing board 10. The uniformity of the image sensing board 10 may be measured by the difference in the luminance data when the same display image is obtained by using different obtaining regions 11 of the image sensing board 10. A greater difference in the luminance data indicates poorer uniformity of the image sensing board 10. FIG. 2 is a schematic diagram of division of an image sensing board into obtaining regions according to an embodiment of the present application. Referring to FIG. 2, in this embodiment, the image sensing board 10 of the camera is divided into at least two obtaining regions 11 (where, for example, FIG. 2 shows the division of the image sensing board 10 into four obtaining regions 11), and then each obtaining region 11 is used to obtain luminance data of a display image of one display panel 12. In this way, the obtaining of luminance data of display images of a plurality of display panels 12 using one camera is implemented.

The difference in compensation basic data when the same display image is obtained by using obtaining regions 11 being less than or equal to the set threshold means that the difference in the compensation basic data when the same display image is obtained by using any two obtaining regions 11 is less than or equal to the set threshold. The difference in the compensation basic data when the same display image is obtained by using the two obtaining regions 11 may be the difference in the compensation basic data when the same display image is obtained by using the two obtaining regions 11, a ratio of the compensation basic data, or a value calculated therefor according to other setting rules. A value of the set threshold may be set according to the requirement for the uniformity of the image sensing board, that is, the set threshold needs to meet the requirement for the uniformity of the image sensing board.

In this step, the uniformity compensation is performed on the image sensing board 10 to eliminate the difference in the luminance data when the same display image is obtained by using the obtaining regions 11. Therefore, when the luminance data of the display images of the plurality of display panels 12 is obtained subsequently by the image sensing board 10, the difference in the luminance data when the same display image is obtained by using the obtaining regions 11 is less than or equal to the set threshold, which reduces errors in the obtained compensation basic data due to poor uniformity of the obtaining regions 11 of the image sensing board 10 of the camera.

Step 120: Simultaneously obtain compensation basic data of different display panels by using different obtaining regions of the image sensing board. The compensation basic data is used to determine compensation data used for luminance compensation of the display panel.

Simultaneously obtaining compensation basic data of different display panels by using different obtaining regions of the image sensing board means using each obtaining region to correspondingly obtain compensation basic data of one display panel, and different obtaining regions corresponding to different display panels. After the uniformity compensation is performed on the image sensing board, the compensation basic data of different display panels is obtained simultaneously by using different obtaining regions of the image sensing board, and the display images of the plurality of display panels are captured by using one camera (for example, FIG. 2 shows simultaneous obtaining of display images of four display panels 12 by using four obtaining regions 11 of the image sensing board 10). In this way, the overall capturing efficiency is improved, and the production efficiency of the display panels is thus improved. In addition, the number of cameras used to obtain the compensation basic data during mass production of the display panels is reduced, and the costs of hardware devices are lowered.

In this embodiment, the compensation basic data may be the luminance data of the display image obtained. The compensation basic data is used to determine compensation data used for luminance compensation of the display panel. The compensation data may be voltage drop compensation data, mura compensation data, etc. Specifically, in this embodiment, the compensation basic data may be used to determine the voltage drop compensation data for voltage drop compensation of the display panel. In other embodiments, the compensation basic data may be used to determine the mura compensation data for mura compensation of the display panel. The compensation data may be used to compensate for the uniformity of the display image of the display panel, and the display image of the compensated display panel has uniform luminance.

In the method for obtaining compensation basic data of a display panel according to this embodiment, compensation basic data of different display panels is obtained simultaneously by using different obtaining regions of the image sensing board, and simultaneous capturing of the display images of the plurality of display panels using one camera is implemented. In this way, the overall capturing efficiency is improved, and the production efficiency of the display panels is thus improved. In addition, the number of cameras used to obtain the compensation basic data during mass production of the display panels is reduced, and the costs of hardware devices are lowered. Before the compensation basic data is obtained, the uniformity compensation is performed on the image sensing board of the camera, and the difference in the luminance data when the same display image is obtained by using the obtaining regions obtained by dividing the image sensing board is less than or equal to the set threshold, which reduces the difference in the luminance data obtained by using the obtaining regions. Therefore, when the display images of the plurality of display panels are subsequently obtained by using the image sensing board, the difference in the luminance data when the same image is obtained by using the obtaining regions is less than or equal to the set threshold, which reduces errors in the obtained compensation basic data due to poor uniformity of the obtaining regions of the image sensing board of the camera, thereby ensuring the accuracy of compensation data determined based on the compensation basic data.

Figure 3:
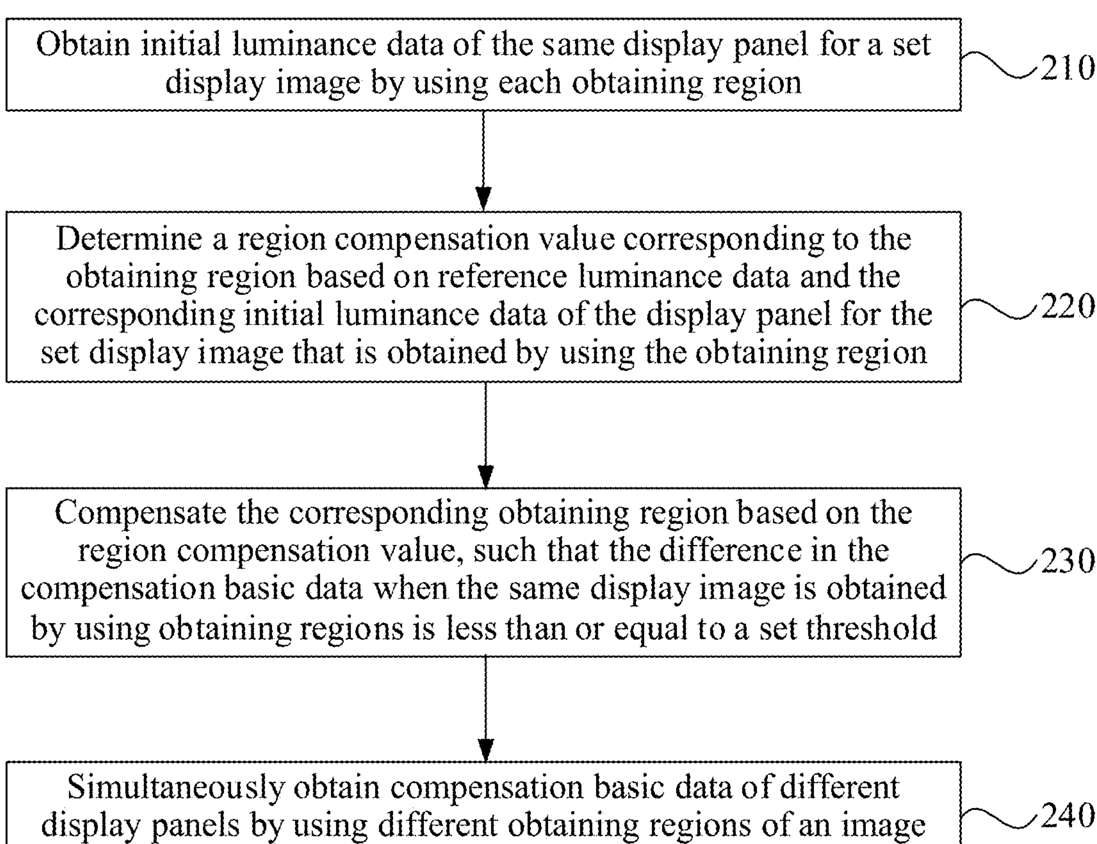
FIG. 3 is a flowchart of another method for obtaining compensation basic data of a display panel according to an embodiment of the present application.

FIG. 3 is a flowchart of another method for obtaining compensation basic data of a display panel according to an embodiment of the present application. Referring to FIG. 3, in one embodiment, the method for obtaining compensation basic data of a display panel includes the following steps.

Step 210: Obtain initial luminance data of the same display panel for a set display image by using each obtaining region. The initial luminance data is luminance data of the display panel for the set display image.

Figure 4:
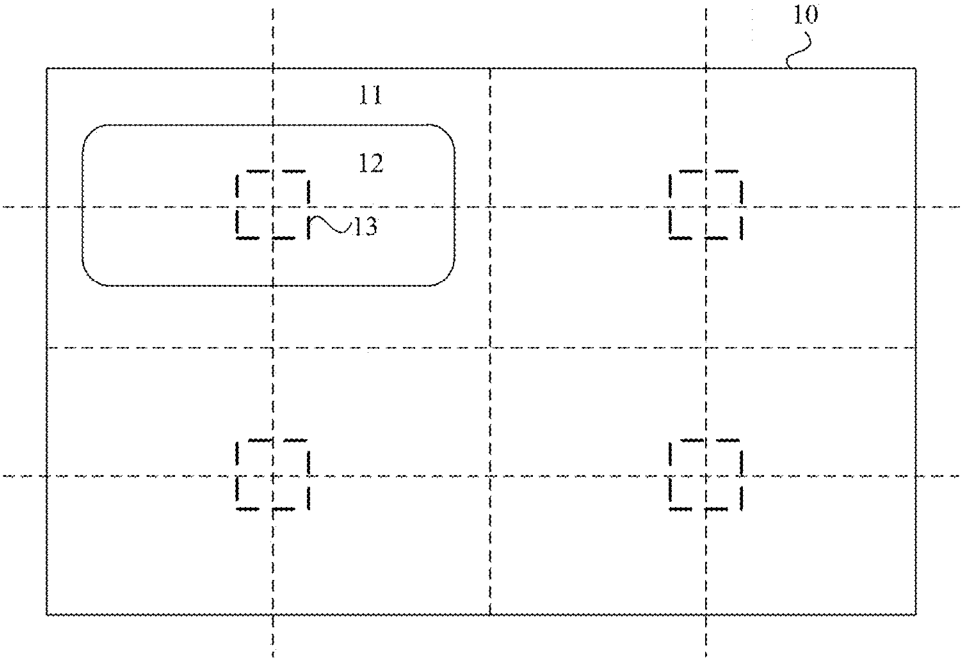
FIG. 4 is a schematic diagram of obtaining of initial luminance data of a display panel by using an obtaining region of an image sensing board according to an embodiment of the present application.

The set display image is a standard white image, and the standard white image is a full-screen white image. In one embodiment, the standard white image is a full-screen white image at the highest gray level. FIG. 4 is a schematic diagram of obtaining of initial luminance data of a display panel by using an obtaining region according to an embodiment of the present application. FIG. 4 schematically shows the division of the image sensing board 10 into four obtaining regions 11. In this step, the initial luminance data of the same display panel 12 for the set display image is obtained by using all obtaining regions 11 one by one. That is, the initial luminance data of the display panel for the set display image is obtained by using one obtaining region 11, then the initial luminance data of the display panel for the set display image is obtained by using another obtaining region 11, and so on, until the initial luminance data of the same display panel for the set display image has been obtained by using all the obtaining regions 11 of the image sensing board.

In step 210 described above, when the initial luminance data of the display panel for the set display image is obtained by using each obtaining region 11, the following steps may be included.

First, the obtaining region 11 is aligned with the display panel 12, and the center of the obtaining region 11 coincides with the center of the display panel 12. As shown in FIG. 4, the obtaining region 11 at the upper left corner has been aligned with the display panel 12. Then, luminance data of a plurality of sub-pixels in the central region (where the central region may be a first region 13 shown in FIG. 4, the center of the first region 13 is the center of the display panel 12, and the area of the first region 13 is less than the area of the display panel 12) of the display panel 12 is obtained by using the obtaining region 11, and an average value of the luminance data of the plurality of sub-pixels is used as the initial luminance data corresponding to the obtaining region 11.

Specifically, the display panel 12 is first aligned with one obtaining region 11. The specific alignment manner may involve adjusting the relative position of the image sensing board of the camera and the display panel 12 and the entire display panel 12 is located within the obtaining range of the obtaining region 11, and then enabling the center of the obtaining region 11 to coincide with the center of the display panel 12 that is caught by the obtaining region 11. Therefore, the luminance data of the display panel 12 for the set display image is obtained. For example, obtaining the luminance data of the plurality of sub-pixels in the central region of the display panel 12 by using the obtaining region 11 may be obtaining luminance data of n*n sub-pixels in the central region of the display panel 12, n being an integer greater than or equal to 2.

Step 220: Determine a region compensation value corresponding to the obtaining region based on reference luminance data and the corresponding initial luminance data of the display panel for the set display image that is obtained by using the obtaining region.

In one embodiment, a region compensation value corresponding to the obtaining region 11 is determined based on the difference between the reference luminance data and the corresponding initial luminance data of the display panel 12 for the set display image that is obtained by using the obtaining region 11. In one embodiment of the present application, the reference luminance data may be obtained in advance of this step by using other obtaining devices (which may be, but are not limited to, a camera, a luminometer, or a color analyzer) that can ensure the obtaining accuracy, and then stored in the camera. In another embodiment of the present application, the reference luminance data may be obtained by using a camera for performing the method prior to step 220. For example, before execution of step 220, the corresponding initial luminance data of the display panel for the set display image that is obtained by using one obtaining region 11 among the obtaining regions 11 included in the image sensing board is used as the reference luminance data. Then, the region compensation value corresponding to the obtaining region 11 for which the initial luminance data is used as the reference luminance data is 0, and region compensation values corresponding to other obtaining regions 11 may be determined based on the difference between other obtaining regions 11 and the obtaining region 11 for which the initial luminance data is used as the reference luminance data.

Alternatively, before execution of step 220, the center of the display panel 12 is aligned with the center of the image sensing board, the initial luminance data of the display panel 12 for the set display image is obtained by using the central region of the image sensing board, and the initial luminance data of the display panel 12 for the set display image that is obtained by using the central region of the image sensing board is used as the reference luminance data. In this way, the region compensation value corresponding to the obtaining region 11 is determined based on the initial luminance data of the display panel 12 for the set display image that is obtained by using the obtaining region 11 and the initial luminance data of the display panel 12 for the set display image that is obtained by using the central region of the image sensing board.

Step 230: Compensate the corresponding obtaining region based on the region compensation value, and the difference in the compensation basic data when the same display image is obtained by using obtaining regions is less than or equal to the set threshold.

Specifically, after the region compensation value is determined, the obtaining region 11 is compensated based on the region compensation value corresponding to the obtaining region 11, and the difference in the compensation basic data when the same display image is obtained by using the obtaining regions 11 is less than or equal to the set threshold. Therefore, the uniformity of the image sensing board itself is ensured.

Step 240: Simultaneously obtain compensation basic data of different display panels by using different obtaining regions of the image sensing board. The compensation basic data is used to determine compensation data used for luminance compensation of the display panel. This step has the same process as step 120 in the above embodiment, and will not be repeated herein.

In one embodiment, the camera includes a lens and the image sensing board, where the lens converges light onto the image sensing board. The image sensing board may include an array of photosensitive devices. The array of photosensitive devices includes a plurality of photosensitive devices, where the photosensitive devices may be photodiodes. The lens may be a micro-lens, which may include miniature lens glass that corresponds to the photosensitive devices on a one-to-one basis.

In the above embodiment, before step 110 and step 210, the method further includes: performing lens distortion compensation on the camera. Therefore, the impact of lens distortion on the accuracy of the obtained compensation basic data is avoided.

Figure 5:
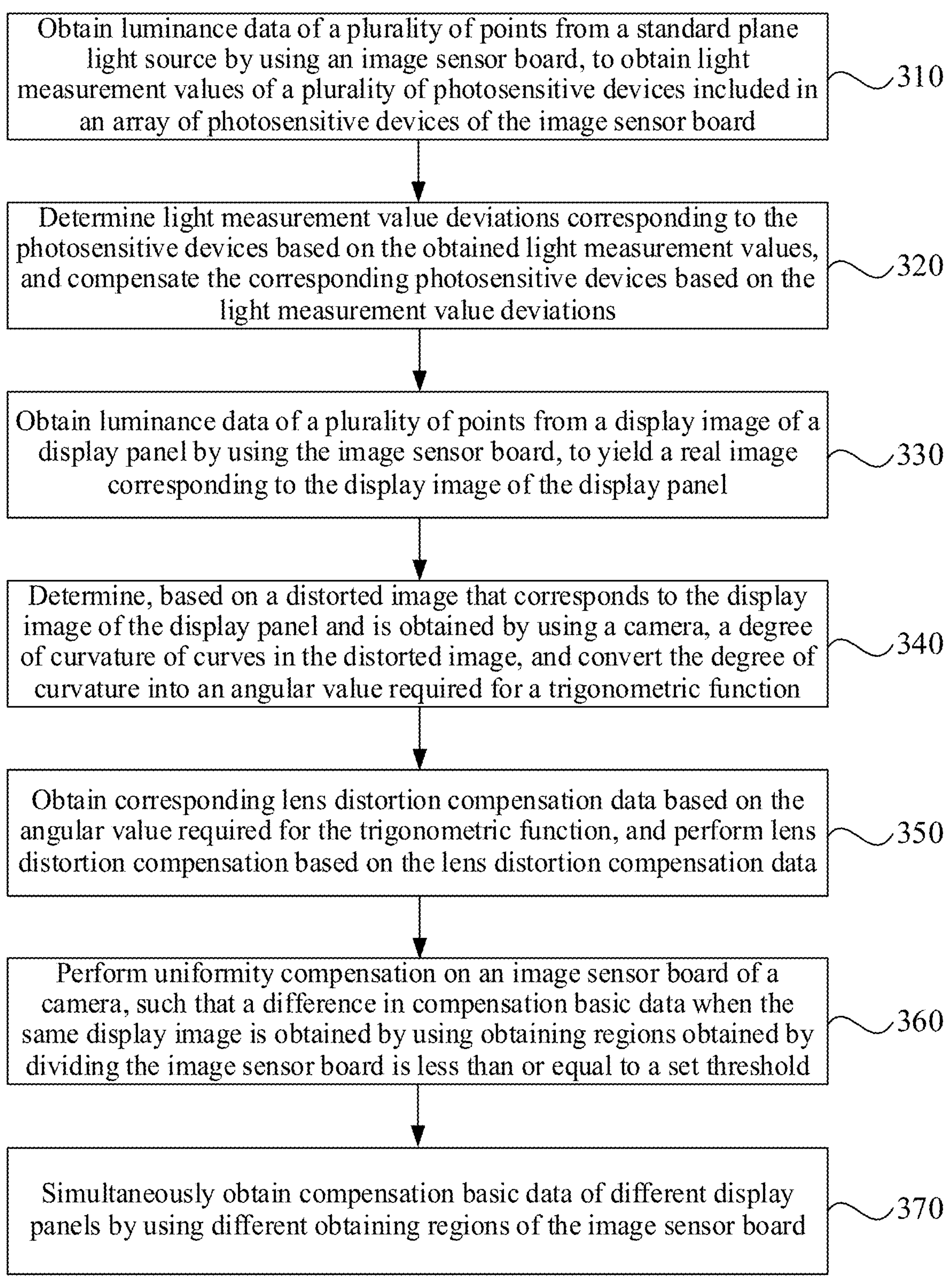
FIG. 5 is a flowchart of another method for obtaining compensation basic data of a display panel according to an embodiment of the present application.

FIG. 5 is a flowchart of another method for obtaining compensation basic data of a display panel according to an embodiment of the present application. Referring to FIG. 5, the method for obtaining compensation basic data of a display panel includes the following steps.

Step 310: Obtain luminance data of a plurality of points from a standard plane light source by using the image sensing board, to obtain light measurement values of a plurality of photosensitive devices included in the array of photosensitive devices of the image sensing board.

The standard plane light source is a plane light source that emits light of the same color and luminance at all positions. The image sensing board includes the array of photosensitive devices, which includes a plurality of photosensitive devices. When the image sensing board is used to obtain the luminance data of the standard plane light source, each photosensitive device may obtain a corresponding light measurement value. Due to a greater number of uncontrollable factors in the manufacturing process of the photosensitive devices and different aging levels of the photosensitive devices, different photosensitive devices may have different light measurement values.

Step 320: Determine light measurement value deviations corresponding to the photosensitive devices based on the obtained light measurement values, and compensate the corresponding photosensitive devices based on the light measurement value deviations.

In one embodiment, the same light measurement value occurring most frequently among the light measurement values obtained by the plurality of photosensitive devices is used as the reference light measurement value, and then the differences between the light measurement values of the photosensitive devices and the reference light measurement value are determined as the light measurement deviations for the photosensitive devices; and then, the photosensitive devices are compensated based on the light measurement deviations, and the photosensitive devices have the same light measurement value for the standard plane light source.

It should be noted that the reference light measurement value may also be determined in another way, for example, by using the average value of the light measurement values obtained by the photosensitive devices as the reference light measurement value, or may be determined in other ways than the above two ways. This is not specifically limited in this embodiment.

Step 330: Obtain luminance data of a plurality of points from the display image of the display panel by using the image sensing board, to yield a real image corresponding to the display image of the display panel. The display image in this step 330 may be a specific display image for lens compensation.

Figure 6:
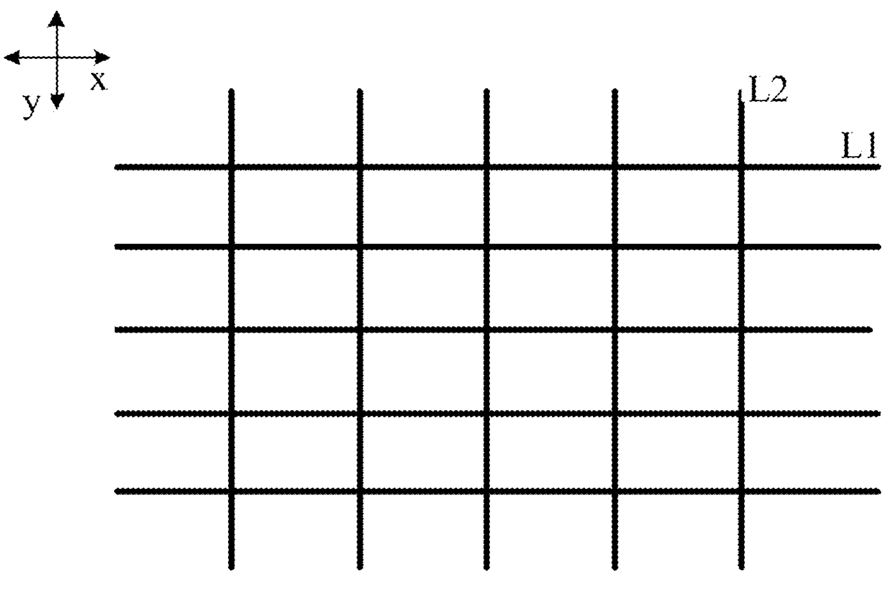
FIG. 6 is a schematic diagram of a real image corresponding to a display image of a display panel according to an embodiment of the present application.
Figure 7:
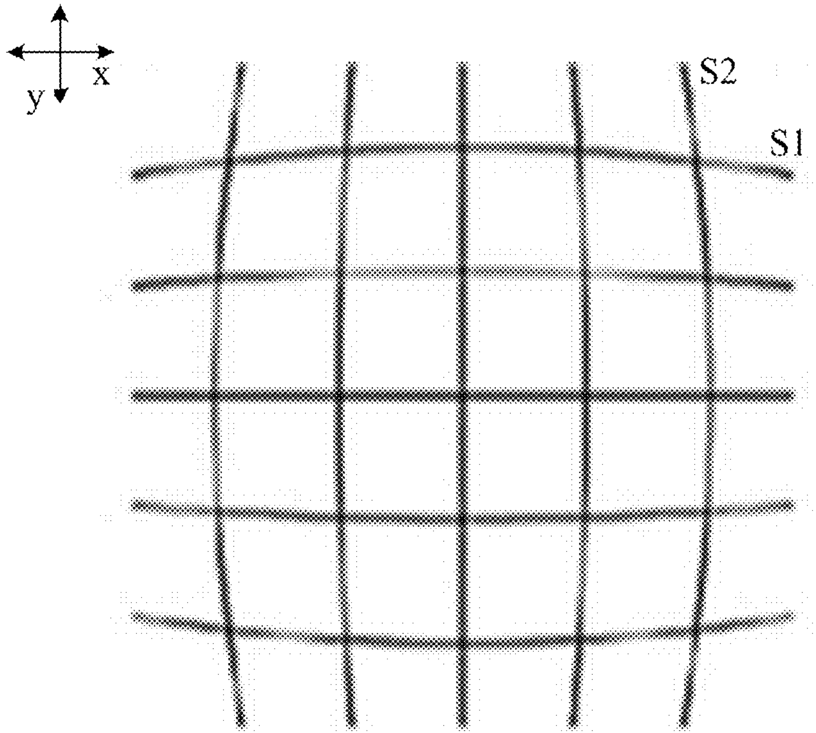
FIG. 7 is a schematic diagram of a distorted image corresponding to a display image of a display panel that is obtained by using a camera before being subjected to lens distortion compensation according to an embodiment of the present application.

FIG. 6 is a schematic diagram of a real image corresponding to a display image of a display panel according to an embodiment of the present application. Referring to FIG. 6, the real image corresponding to the specific display image for lens compensation of the display panel includes a plurality of first straight lines L1 extending in a first direction x and a plurality of second straight lines L2 extending in a second direction y, the first direction x being perpendicular to the second direction y. FIG. 7 is a schematic diagram of a distorted image corresponding to a display image of a display panel that is obtained by using a camera before being subjected to lens distortion compensation according to an embodiment of the present application. Referring to FIG. 7, in the presence of lens distortion, the distorted image corresponding to the display image of the display panel that is obtained by using the camera is inaccurate. In the distorted image corresponding to the display image of the display panel that is obtained by using the camera, lines corresponding to the first straight line L1 and the second straight line L2 in the real image of FIG. 6 are both curved. Curves in the distorted image include a first curve S1 and a second curve S2, where the first curve S1 corresponds to the first straight line L1 in the real image of FIG. 6, and the second curve S2 corresponds to the second straight line L2 in the real image of FIG. 6.

Step 340: Determine, based on a distorted image that corresponds to the display image of the display panel and is obtained by using the camera, a degree of curvature of curves in the distorted image, and convert the degree of curvature into an angular value required for a trigonometric function.

Step 350: Obtain corresponding lens distortion compensation data based on the angular value required for the trigonometric function, and perform the lens distortion compensation based on the lens distortion compensation data.

Specifically, based on the angular value required for the trigonometric function, the corresponding lens distortion compensation data is obtained using any lens distortion compensation algorithm in the related art, and the lens distortion compensation is then performed to remove the impact of lens distortion on the obtained compensation basic data.

Steps 330 to 350 described above are the lens distortion compensation step.

Step 360: Perform uniformity compensation on an image sensing board of a camera, and a difference in compensation basic data when the same display image is obtained by using obtaining regions 11 obtained by dividing the image sensing board is less than or equal to a set threshold. This step has the same process as step 110 described above, and will not be repeated herein.

Step 370: Simultaneously obtain compensation basic data of different display panels by using different obtaining regions of the image sensing board. The compensation basic data is used to determine compensation data used for luminance compensation of the display panel. This step has the same process as step 120 described above, and will not be repeated herein.

As described in the above embodiment, the compensation basic data is luminance data. The luminance data may be used to determine voltage drop compensation data used for voltage drop compensation of the display panel. The voltage drop compensation includes at least voltage drop compensation for the display panel to display a full-screen image and voltage drop compensation for the display panel to display a non-full-screen image. The voltage drop compensation for the display panel to display a full-screen image is hereinafter referred to as first voltage drop compensation, and compensation basic data (i.e., luminance data) required for the first voltage drop compensation is data required for the first voltage drop compensation, where the data required for the first voltage drop compensation may correspond to data required to compensate for a voltage drop generated by transmitting signals in a signal line when the display panel displays the full-screen image. The voltage drop compensation for the display panel to display a non-full-screen image is hereinafter referred to as second voltage drop compensation, and compensation basic data (i.e., luminance data) required for the second voltage drop compensation is data required for the second voltage drop compensation, where the data required for the second voltage drop compensation may correspond to data required to compensate for a voltage drop generated by transmitting signals in a signal line when the display panel displays the non-full-screen image.

Figure 8:
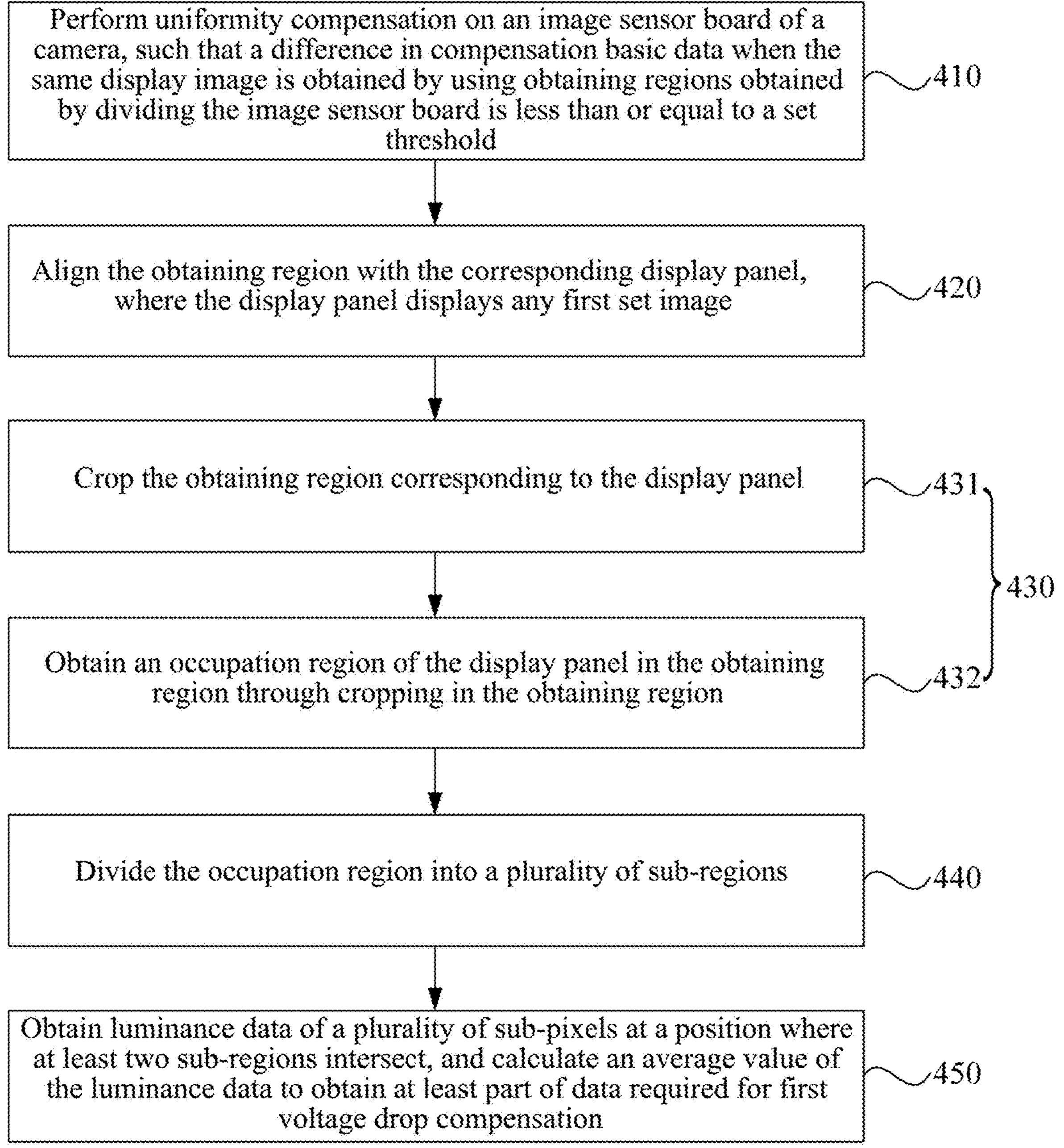
FIG. 8 is a flowchart of another method for obtaining compensation basic data of a display panel according to an embodiment of the present application.
Figure 9:
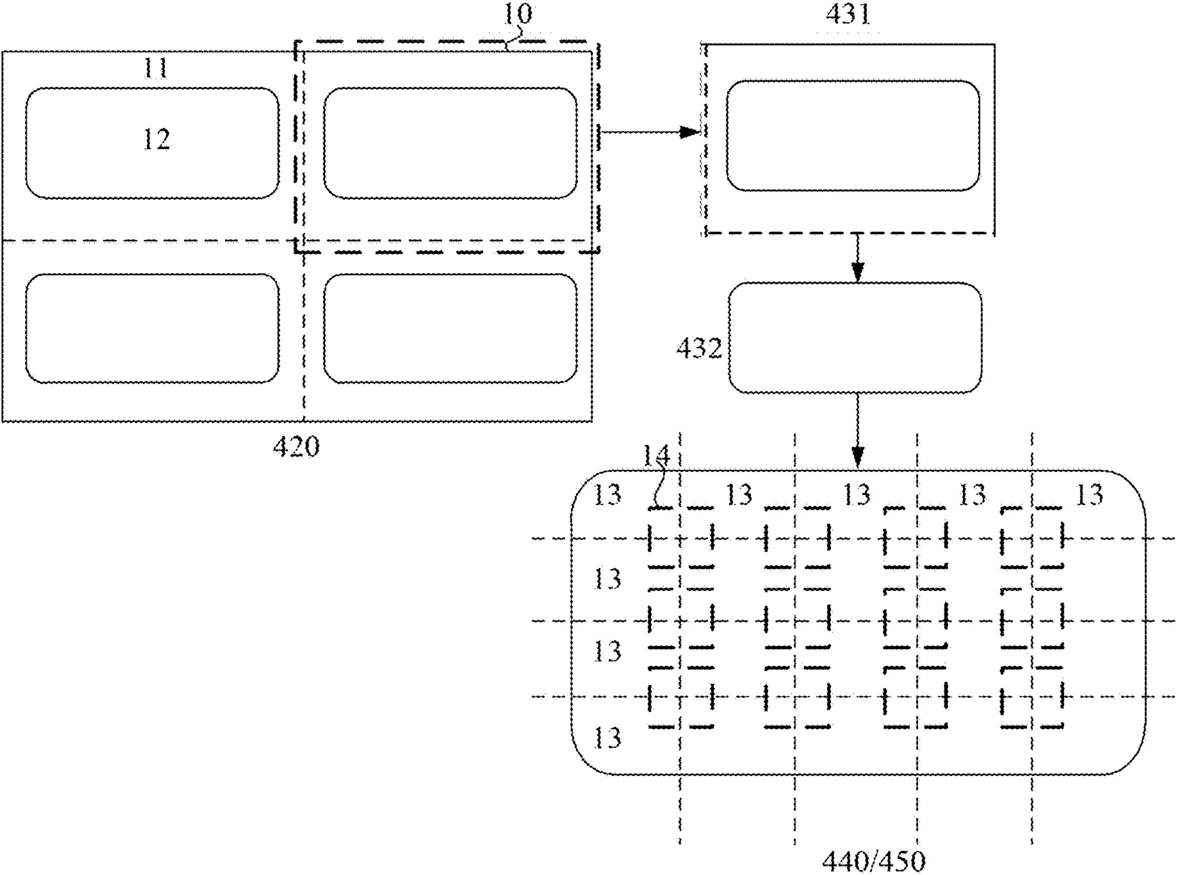
FIG. 9 is a schematic diagram of a process for obtaining compensation basic data according to an embodiment of the present application.

FIG. 8 is a flowchart of another method for obtaining compensation basic data of a display panel according to an embodiment of the present application, and FIG. 9 is a schematic diagram of a process for obtaining compensation basic data according to an embodiment of the present application. Referring to FIG. 8 and FIG. 9, the method for obtaining compensation basic data of a display panel includes the following steps.

Step 410: Perform uniformity compensation on an image sensing board of a camera, and a difference in compensation basic data when the same display image is obtained by using obtaining regions obtained by dividing the image sensing board is less than or equal to a set threshold. This step has the same process as step 110 described above, and will not be repeated herein.

Step 420: Align the obtaining region with the corresponding display panel, where the display panel displays any first set image.

The part at the upper left corner of FIG. 9 corresponds to the action of step 420, which shows that the obtaining region 11 is aligned with the corresponding display panel 12. The first set image is a display image required to obtain the data required for the first voltage drop compensation. When the data required for the first voltage drop compensation is obtained, after the obtaining region 11 is aligned with the corresponding display panel 12, luminance data of a plurality of first set images can be obtained to obtain the data required for the first voltage drop compensation.

Step 430: Obtain an occupation region corresponding to the display panel in the obtaining region through cropping.

Specifically, referring to FIG. 9, step 430 includes the following steps. Step 431: Crop the obtaining region corresponding to the display panel.

Step 432: Obtain the occupation region of the display panel in the obtaining region through cropping in the obtaining region.

For example, FIG. 9 only shows the cropping of one of the obtaining regions 11. In this step, the obtaining regions 11 corresponding to the display panels 12 can be simultaneously cropped, and then the occupation regions of the display panels 12 in the corresponding obtaining regions 11 can be obtained through cropping. In this step, it needs to be ensured that the display panel 12 is within the obtaining range of the corresponding obtaining region 11, and the occupation region is the region occupied by the display panel 12 within the obtaining range of the obtaining region 11. Referring to FIG. 9, the area of the occupation region may be less than the area of the obtaining region 11.

Step 440: Divide the occupation region into a plurality of sub-regions.

The part at the lower right corner of FIG. 9 is a schematic diagram of dividing the occupation region into a plurality of sub-regions 13. Referring to FIG. 9, the occupation region may be divided into p*q sub-regions 13, in one embodiment, p being greater than or equal to 2, and q being greater than or equal to 2. For example, FIG. 9 schematically shows the division of the occupation region into 4*5 sub-regions 13.

Step 450: Obtain luminance data of a plurality of sub-pixels at a position where at least two sub-regions intersect, and calculate an average value of the luminance data to obtain at least part of the data required for the first voltage drop compensation.

In one embodiment, luminance data of n*n sub-pixels at a position where at least two sub-regions 13 intersect (corresponding to a boxed region 14 of FIG. 9 where the intersection position is located) is obtained, n being greater than or equal to 2. Referring to FIG. 9, four sub-regions 13 share one intersection position, and the occupation region includes a total of twelve such intersection positions. Accordingly, it is possible to obtain the luminance data of the n*n sub-pixels at each of the twelve intersection positions, and calculate the average value of the luminance data of the n*n sub-pixels at each intersection position, to obtain the at least part of the data required for the first voltage drop compensation.

Figures 10, 11:
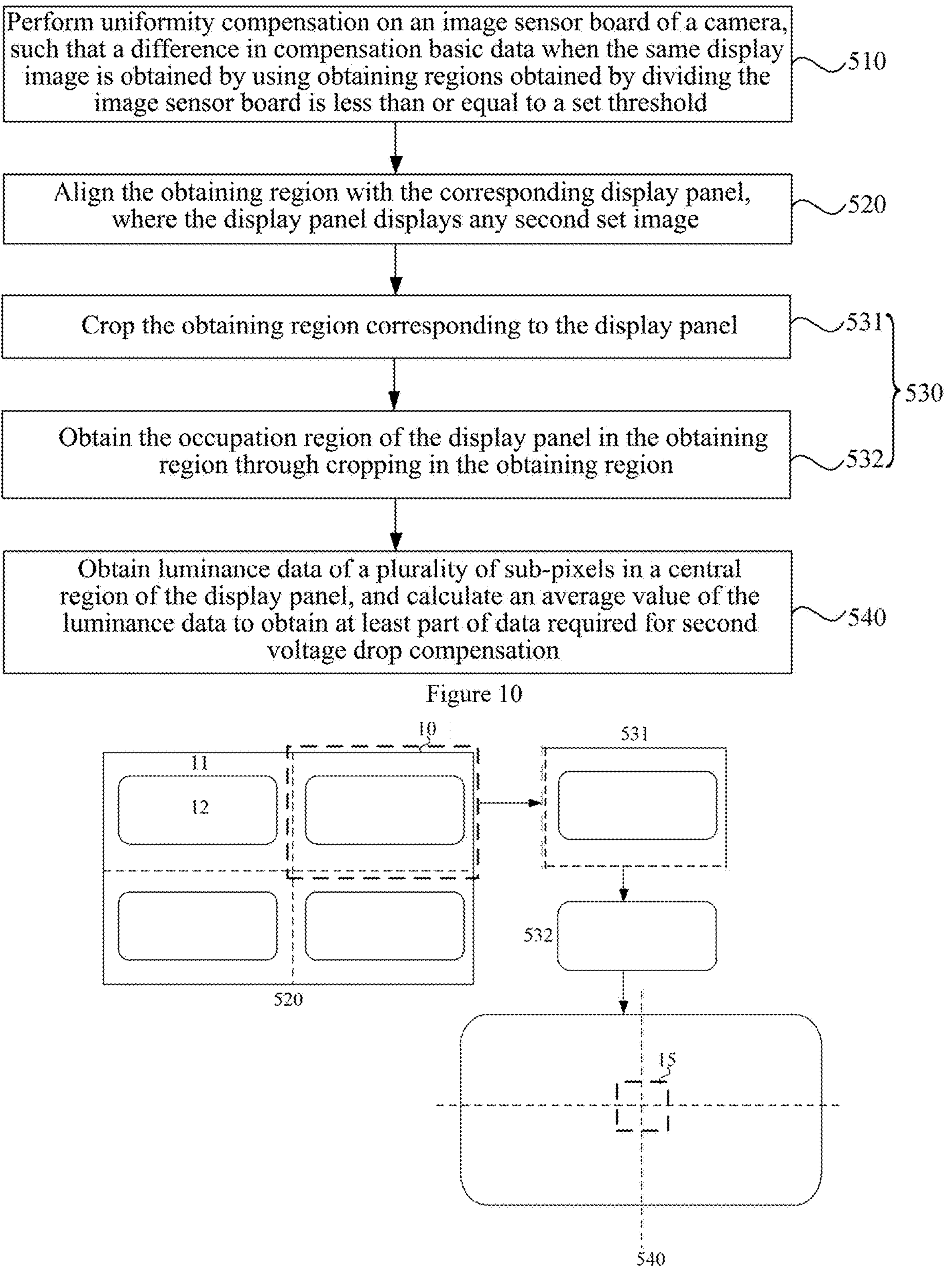
FIG. 10 is a flowchart of another method for obtaining compensation basic data of a display panel according to an embodiment of the present application.
FIG. 11 is a schematic diagram of another process for obtaining compensation basic data according to an embodiment of the present application.

FIG. 10 is a flowchart of another method for obtaining compensation basic data of a display panel according to an embodiment of the present application, and FIG. 11 is a schematic diagram of another process for obtaining compensation basic data according to an embodiment of the present application. Referring to FIG. 10 and FIG. 11, the method for obtaining compensation basic data of a display panel includes the following steps.

Step 510: Perform uniformity compensation on an image sensing board of a camera, and a difference in compensation basic data when the same display image is obtained by using obtaining regions 11 obtained by dividing the image sensing board is less than or equal to a set threshold. This step has the same process as step 110 described above, and will not be repeated herein.

Step 520: Align the obtaining region with the corresponding display panel, where the display panel 12 displays any second set image.

Specifically, in this step, each obtaining region is aligned with the corresponding display panel. The part at the upper left corner of FIG. 11 corresponds to the action of step 520, which shows that the obtaining region 11 is aligned with the corresponding display panel 12. The second set image is a display image required to obtain the data required for the second voltage drop compensation. When the data required for the second voltage drop compensation is obtained, after the obtaining region is aligned with the corresponding display panel, luminance data of a plurality of second set images can be obtained to obtain the data required for the second voltage drop compensation.

Step 530: Obtain an occupation region corresponding to the display panel in the obtaining region through cropping.

Specifically, referring to FIG. 11, step 530 includes the following steps.

Step 531: Crop the obtaining region corresponding to the display panel.

Step 532: Obtain the occupation region of the display panel in the obtaining region through cropping in the obtaining region.

In this step, the obtaining regions corresponding to the display panels can be simultaneously cropped, and then the occupation regions of the display panels in the corresponding obtaining regions can be obtained through cropping.

Step 540: Obtain luminance data of a plurality of sub-pixels in a central region of the display panel, and calculate an average value of the luminance data to obtain at least part of the data required for the second voltage drop compensation.

The part shown at the lower right corner of FIG. 11 may correspond to step 540 of obtaining luminance data of a plurality of sub-pixels in a central region 15 of the display panel, in one embodiment, obtaining luminance data of n*n sub-pixels in the central region 15 of the display panel, n being greater than or equal to 2.

It should be noted that in the above embodiments of the present application, the compensation basic data of different display panels is obtained by using different obtaining regions. Accordingly, when the obtained compensation basic data is processed, parallel processing may be performed thereon by regions to improve efficiency.

Figure 12:
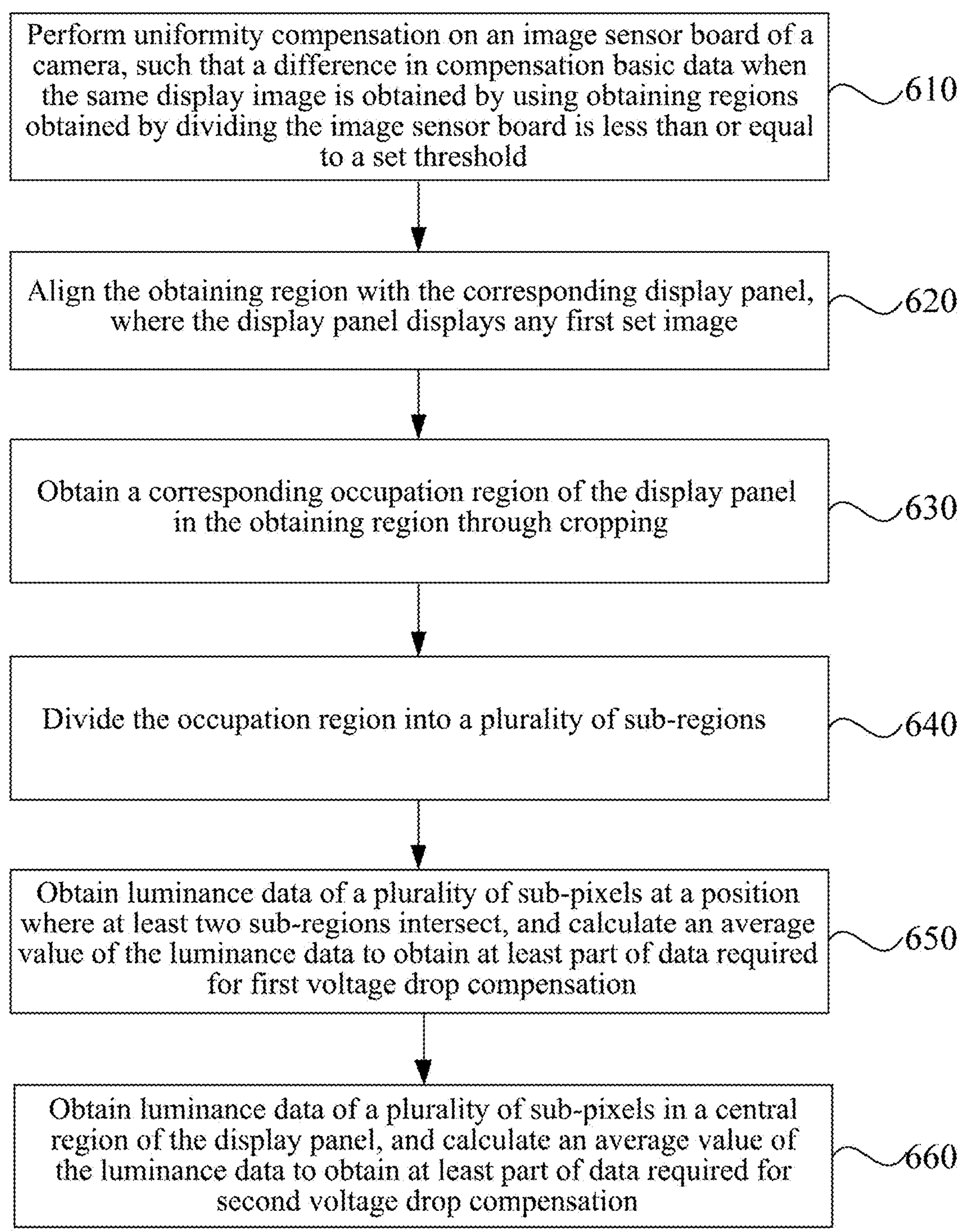
FIG. 12 is a flowchart of another method for obtaining compensation basic data of a display panel according to an embodiment of the present application.

It should also be noted that the methods in the above embodiments may be combined. For example, in the above embodiments corresponding to FIG. 8 and FIG. 10, since the uniformity compensation has already been performed on the image sensing board in step 410, the alignment step has already been performed in step 420, and the step of obtaining the occupation region through cropping has already been performed in step 430, it is possible to directly perform the action corresponding to step 540 after performing the actions corresponding to steps 410 to 450 (i.e., obtaining the data required for the first voltage drop compensation). For details, reference may be made to FIG. 12. FIG. 12 is a flowchart of another method for obtaining compensation basic data of a display panel according to an embodiment of the present application. Referring to FIG. 12, the method for obtaining compensation basic data of a display panel specifically includes the following steps.

Step 610: Perform uniformity compensation on an image sensing board of a camera, and a difference in compensation basic data when the same display image is obtained by using obtaining regions obtained by dividing the image sensing board is less than or equal to a set threshold.

Step 620: Align the obtaining region with the corresponding display panel, where the display panel displays any first set image.

Step 630: Obtain an occupation region corresponding to the display panel in the obtaining region through cropping.

Step 640: Divide the occupation region into a plurality of sub-regions.

Step 650: Obtain luminance data of a plurality of sub-pixels at a position where at least two sub-regions intersect, and calculate an average value of the luminance data to obtain at least part of the data required for the first voltage drop compensation.

Step 660: Obtain luminance data of a plurality of sub-pixels in a central region of the display panel, and calculate an average value of the luminance data to obtain at least part of the data required for the second voltage drop compensation.

In the method for obtaining compensation basic data of a display panel according to this embodiment, the common steps in the process of obtaining the data required for the second voltage drop compensation and the data required for the first voltage drop compensation are combined, which simplifies the obtaining process of the method for obtaining compensation basic data of a display panel, thereby further improving the efficiency in obtaining the compensation basic data of the display panel.

On the basis of the above embodiments, the areas of the display panels corresponding to different obtaining regions are different; and/or the areas of different obtaining regions are different.

Specifically, when compensation basic data of display images of display panels with different areas needs to be obtained, the image sensing board may be correspondingly divided into obtaining regions with different areas, and the area of the obtaining region matches the area of the display panel. This facilitates improving the accuracy of the obtained compensation basic data.

Figure 13:
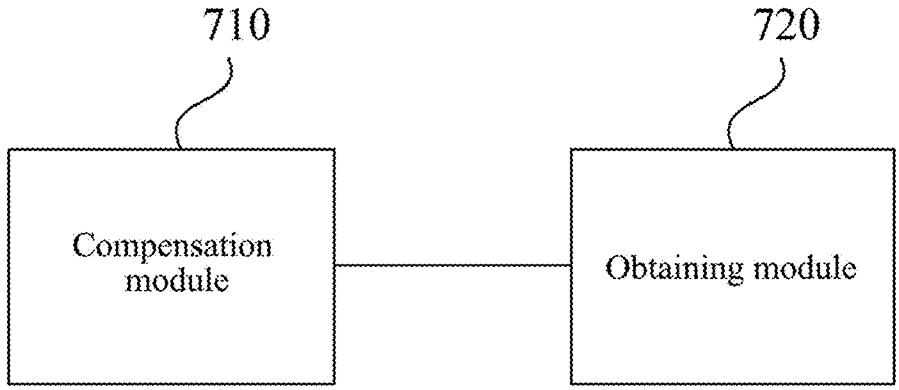
FIG. 13 is a schematic diagram of a structure of an apparatus for obtaining compensation basic data of a display panel according to an embodiment of the present application.

An embodiment of the present application further provides an apparatus for obtaining compensation basic data of a display panel. The apparatus for obtaining compensation basic data of a display panel is configured to perform the method for obtaining compensation basic data of a display panel according to any one of the above embodiments of the present application. FIG. 13 is a schematic diagram of a structure of an apparatus for obtaining compensation basic data of a display panel according to an embodiment of the present application. Referring to FIG. 13, the apparatus for obtaining compensation basic data of a display panel includes:

a compensation module 710 configured to perform uniformity compensation on an image sensing board of a camera, and a difference in compensation basic data when the same display image is obtained by using obtaining regions obtained by dividing the image sensing board is less than or equal to a set threshold, where the image sensing board is divided into at least two obtaining regions; and an obtaining module 720 configured to simultaneously obtain compensation basic data of different display panels by using different obtaining regions of the image sensing board, where the compensation basic data is used to determine compensation data used for luminance compensation of the display panel.

The apparatus for obtaining compensation basic data of a display panel is configured to perform the method for obtaining compensation basic data of a display panel according to any one of the above embodiments of the present application, and has the beneficial effects of the method for obtaining compensation basic data of a display panel according to any one of the above embodiments of the present application. Details are not described herein.

Figure 14:
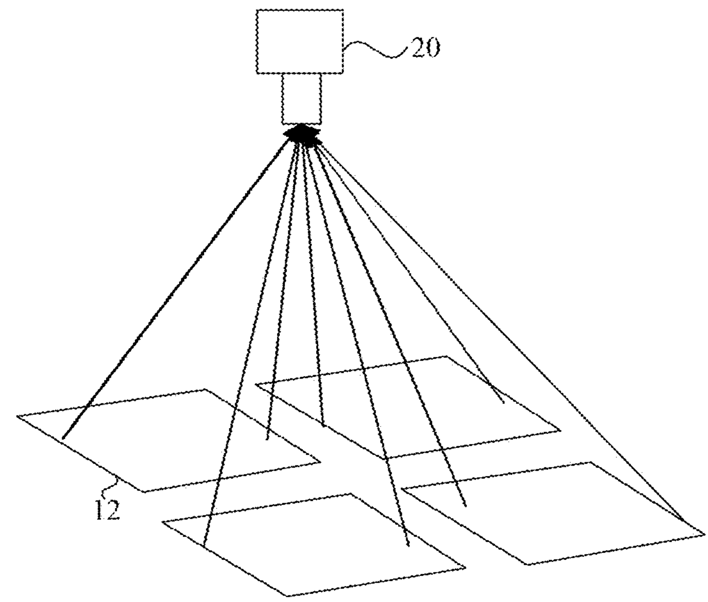
FIG. 14 is a schematic diagram of a structure of a system for obtaining compensation basic data of a display panel according to an embodiment of the present application.

An embodiment of the present application further provides a system for obtaining compensation basic data of a display panel. FIG. 14 is a schematic diagram of a structure of a system for obtaining compensation basic data of a display panel according to an embodiment of the present application. Referring to FIG. 14, the system for obtaining compensation basic data of a display panel includes a camera 20 and a plurality of display panels 12, where the camera 20 is configured to obtain compensation basic data of the display panels 12 by using the method for obtaining compensation basic data of a display panel according to any one of the above embodiments of the present application.

In the system for obtaining compensation basic data of a display panel according to this embodiment, the compensation basic data of the plurality of display panels is obtained by using one camera, which improves the overall capturing efficiency, thereby improving the production efficiency of the display panels. In addition, the number of cameras used to obtain the compensation basic data during mass production of the display panels is reduced, and the costs of hardware devices are lowered. Since cameras and camera-related fixtures take up a certain amount of space, the system for obtaining compensation basic data of a display panel according to this embodiment may also take up a smaller space. In addition, in the related art, in a system in which one camera captures one display panel, the camera tends to capture display panels captured by other cameras, causing mutual influence between the cameras when obtaining compensation basic data. However, in the system for obtaining compensation basic data of a display panel according to this embodiment, the compensation basic data of the plurality of display panels is obtained by using one camera, which facilitates reducing the mutual influence between the cameras when obtaining the compensation basic data, thereby improving the accuracy of the obtained compensation basic data.

An embodiment of the present application further provides a storage medium having a computer program stored thereon, where the program, when executed by a processor in a camera, causes the method for obtaining compensation basic data of a display panel according to any one of the above embodiments of the present application to be implemented.

The storage medium may be a non-transitory storage medium.

The application is not limited to the particular embodiments described herein and that various changes, readjustments, and substitutions can be made without departing from the scope of protection of the present application. Therefore, although the present application has been described in detail through the above embodiments, the present application is not limited to the above embodiments, and can also include more other equivalent embodiments without departing from the concept of the disclosure, and the scope of the present application is determined by the scope of the appended claims.

The invention claimed is:

1. A method for obtaining compensation basic data of a display panel, the method comprising:

performing uniformity compensation on an image sensing board of a camera, a difference in compensation basic data when the same display image is obtained by using a plurality of obtaining regions obtained by dividing the image sensing board is less than or equal to a set threshold, wherein the image sensing board comprises at least two obtaining regions; and obtaining compensation basic data of different display panels by using different obtaining regions of the image sensing board, wherein the compensation basic data is used to determine compensation data used for luminance compensation of the display panel, wherein the performing uniformity compensation on an image sensing board of a camera, a difference in compensation basic data when the same display image is obtained by using a plurality of obtaining regions obtained by dividing the image sensing board is less than or equal to a set threshold comprises:

obtaining initial luminance data of the same display panel for a set display image by using each obtaining region, and determining a region compensation value corresponding to the obtaining region based on reference luminance data and the corresponding initial luminance data of the display panel for the set display image that is obtained by using the obtaining region; and compensating the corresponding obtaining region based on the region compensation value, the difference in the compensation basic data when the same display image is obtained by using the plurality of obtaining regions is less than or equal to the set threshold.

2. The method for obtaining compensation basic data of a display panel according to claim 1, wherein the set display image is a white image.

3. The method for obtaining compensation basic data of a display panel according to claim 1, wherein the obtaining initial luminance data of the same display panel for a set display image by using each obtaining region comprises:

aligning the obtaining region with the display panel, the center of the obtaining region coincides with the center of the display panel; and obtaining luminance data of a plurality of sub-pixels of a central region of the display panel by using the obtaining region, and using an average value of the luminance data of the plurality of sub-pixels as the initial luminance data corresponding to the obtaining region.

4. The method for obtaining compensation basic data of a display panel according to claim 1, wherein before the determining a region compensation value corresponding to the obtaining region based on reference luminance data and the corresponding initial luminance data of the display panel for the set display image that is obtained by using the obtaining region, the method further comprises:

using, as the reference luminance data, corresponding initial luminance data of the display panel for the set display image that is obtained by using one of the plurality of obtaining regions comprised in the image sensing board; or aligning the center of the display panel with the center of the image sensing board, obtaining initial luminance data of the display panel for the set display image by using a central region of the image sensing board, and using, as the reference luminance data, the initial luminance data of the display panel for the set display image that is obtained by using the central region of the image sensing board.

5. The method for obtaining compensation basic data of a display panel according to claim 1, wherein the camera comprises a lens, and before the performing uniformity compensation on an image sensing board of a camera, a difference in compensation basic data when the same display image is obtained by using a plurality of obtaining regions obtained by dividing the image sensing board is less than or equal to a set threshold, the method further comprises:

performing lens distortion compensation on the camera.

6. The method for obtaining compensation basic data of a display panel according to claim 5, wherein the image sensing board comprises an array of photosensitive devices; and before the performing lens distortion compensation on the camera, the method further comprises:

obtaining luminance of a plurality of points from a standard plane light source by using the image sensing board, to obtain light measurement values of a plurality of photosensitive devices comprised in the array of photosensitive devices of the image sensing board; and determining light measurement value deviations corresponding to the photosensitive devices based on the obtained light measurement values, and compensating the corresponding photosensitive devices based on the light measurement value deviations.

7. The method for obtaining compensation basic data of a display panel according to claim 6, wherein the determining light measurement value deviations corresponding to the photosensitive devices based on the obtained light measurement values, and compensating the corresponding photosensitive devices based on the light measurement value deviations comprises:

determining differences between the obtained light measurement values and a reference light measurement value as the light measurement value deviations corresponding to the photosensitive devices, and compensating the corresponding photosensitive devices based on the light measurement value deviations.

8. The method for obtaining compensation basic data of a display panel according to claim 6, wherein the performing lens distortion compensation on the camera comprises:

obtaining luminance data of a plurality of points from the display image of the display panel by using the image sensing board, to yield a real image corresponding to the display image of the display panel, wherein the real image corresponding to the display image comprises a plurality of first straight lines extending in a first direction and a plurality of second straight lines extending in a second direction, the first direction being perpendicular to the second direction;

determining, based on a distorted image that corresponds to the display image of the display panel and is obtained by using the camera, a degree of curvature of a plurality of curves in the distorted image, and converting the degree of curvature into an angular value required for a trigonometric function; and obtaining corresponding distortion compensation data based on the angular value required for the trigonometric function, and performing the lens distortion compensation based on the distortion compensation data.

9. The method for obtaining compensation basic data of a display panel according to claim 1, wherein the compensation basic data comprises data required for first voltage drop compensation; and the simultaneously obtaining compensation basic data of different display panels by using different obtaining regions of the image sensing board comprises:

aligning the obtaining region with the corresponding display panel, wherein the display panel displays any first set image;

obtaining an occupation region corresponding to the display panel in the obtaining region through cropping;

dividing the occupation region into a plurality of sub-regions; and obtaining luminance data of a plurality of sub-pixels at a position where at least two of the sub-regions intersect, and calculating an average value of the luminance data to obtain at least part of the data required for the first voltage drop compensation.

10. The method for obtaining compensation basic data of a display panel according to claim 1, wherein the compensation basic data comprises data required for second voltage drop compensation, and the simultaneously obtaining compensation basic data of different display panels by using different obtaining regions of the image sensing board comprises:

aligning the obtaining region with the corresponding display panel, wherein the display panel displays any second set image;

obtaining an occupation region corresponding to the display panel in the obtaining region through cropping; and obtaining luminance data of a plurality of sub-pixels in a central region of the display panel, and calculating an average value of the luminance data to obtain at least part of the data required for the second voltage drop compensation.

11. The method for obtaining compensation basic data of a display panel according to claim 1, wherein the areas of the display panels corresponding to different obtaining regions are different.

12. The method for obtaining compensation basic data of a display panel according to claim 1, wherein the areas of different obtaining regions are different.

13. An apparatus for obtaining compensation basic data of a display panel, the apparatus comprising:

a compensation module configured to perform uniformity compensation on an image sensing board of a camera, a difference in compensation basic data when the same display image is obtained by using a plurality of obtaining regions obtained by dividing the image sensing board is less than or equal to a set threshold, wherein the image sensing board comprises at least two obtaining regions; and an obtaining module configured to simultaneously obtain compensation basic data of different display panels by using different obtaining regions of the image sensing board, wherein the compensation basic data is used to determine compensation data used for luminance compensation of the display panel, wherein the performing uniformity compensation on an image sensing board of a camera, a difference in compensation basic data when the same display image is obtained by using a plurality of obtaining regions obtained by dividing the image sensing board is less than or equal to a set threshold comprises:

obtaining initial luminance data of the same display panel for a ser display image by using each obtaining region; and determining a region compensation value corresponding to the obtaining region based on reference luminance data and the corresponding initial luminance data of the display panel for the set display image that is obtained by using the obtaining region; and compensating the corresponding obtaining region based on the region compensation value, the difference in the compensation basic data when the same display image is obtained by using the plurality of obtaining regions is less than or equal to the set threshold.

14. A system for obtaining compensation basic data of a display panel, the system comprising a camera and a plurality of display panels, wherein the camera is configured to obtain compensation basic data of the plurality of display panels by using a method for obtaining compensation basic data of a display panel, the method comprising:

performing uniformity compensation on an image sensing board of a camera, a difference in compensation basic data when the same display image is obtained by using a plurality of obtaining regions obtained by dividing the image sensing board is less than or equal to a set threshold, wherein the image sensing board comprises at least two obtaining regions; and obtaining compensation basic data of different display panels by using different obtaining regions of the image sensing board, wherein the compensation basic data is used to determine compensation data used for luminance compensation of the display panel wherein the performing uniformity compensation on an image sensing board of a camera, a difference in compensation basic data when the same display image is obtained by using a plurality of obtaining regions obtained by dividing the image sensing board is less than or equal to a set threshold comprises:

obtaining initial luminance data of the same display panel for a set display image by using each obtaining region; and determining a region compensation value corresponding to the obtaining region based on reference luminance data and the corresponding initial luminance data of the display panel for the set display image that is obtained by using the obtaining region; and compensating the corresponding obtaining region based on the region compensation value, the difference in the compensation basic data when the same display image is obtained by using the plurality of obtaining regions is less than or equal to the set threshold.

15. The system for obtaining compensation basic data of a display panel according to claim 14, wherein the camera comprises a lens, and before the performing uniformity compensation on an image sensing board of a camera, a difference in compensation basic data when the same display image is obtained by using a plurality of obtaining regions obtained by dividing the image sensing board is less than or equal to a set threshold, the method further comprises:

performing lens distortion compensation on the camera.

16. The system for obtaining compensation basic data of a display panel according to claim 15, wherein the image sensing board comprises an array of photosensitive devices; and before the performing lens distortion compensation on the camera, the method further comprises:

obtaining luminance of a plurality of points from a standard plane light source by using the image sensing board, to obtain light measurement values of a plurality of photosensitive devices comprised in the array of photosensitive devices of the image sensing board; and determining light measurement value deviations corresponding to the photosensitive devices based on the obtained light measurement values, and compensating the corresponding photosensitive devices based on the light measurement value deviations.

17. The system for obtaining compensation basic data of a display panel according to claim 16, wherein the determining light measurement value deviations corresponding to the photosensitive devices based on the obtained light measurement values, and compensating the corresponding photosensitive devices based on the light measurement value deviations comprises:

determining differences between the obtained light measurement values and a reference light measurement value as the light measurement value deviations corresponding to the photosensitive devices, and compensating the corresponding photosensitive devices based on the light measurement value deviations.

18. The system for obtaining compensation basic data of a display panel according to claim 16, wherein the performing lens distortion compensation on the camera comprises:

obtaining luminance data of a plurality of points from the display image of the display panel by using the image sensing board, to yield a real image corresponding to the display image of the display panel, wherein the real image corresponding to the display image comprises a plurality of first straight lines extending in a first direction and a plurality of second straight lines extending in a second direction, the first direction being perpendicular to the second direction;

determining, based on a distorted image that corresponds to the display image of the display panel and is obtained by using the camera, a degree of curvature of a plurality of curves in the distorted image, and converting the degree of curvature into an angular value required for a trigonometric function; and obtaining corresponding distortion compensation data based on the angular value required for the trigonometric function, and performing the lens distortion compensation based on the distortion compensation data.

19. The system for obtaining compensation basic data of a display panel according to claim 14, wherein the compensation basic data comprises data required for first voltage drop compensation; and the simultaneously obtaining compensation basic data of different display panels by using different obtaining regions of the image sensing board comprises:

aligning the obtaining region with the corresponding display panel, wherein the display panel displays any first set image;

obtaining an occupation region corresponding to the display panel in the obtaining region through cropping;

dividing the occupation region into a plurality of sub-regions; and obtaining luminance data of a plurality of sub-pixels at a position where at least two of the sub-regions intersect, and calculating an average value of the luminance data to obtain at least part of the data required for the first voltage drop compensation.

* * * * *